(12) United States Patent
Frederick et al.

(10) Patent No.: US 10,625,697 B2
(45) Date of Patent: Apr. 21, 2020

(54) MULTI-PURPOSE BRUSH GUARD, CABIN PROTECTOR, AND TAILGATE EXTENDER ACCESSORY

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 53 days.

(21) Appl. No.: 15/875,011

(22) Filed: Jan. 19, 2018

(65) Prior Publication Data

US 2019/0225172 A1   Jul. 25, 2019

(51) Int. Cl.
| | | |
|---|---|---|
| *B60P 3/34* | (2006.01) | |
| *B60R 19/48* | (2006.01) | |
| *B62D 33/02* | (2006.01) | |
| *B60R 19/52* | (2006.01) | |
| *B62D 33/027* | (2006.01) | |

(52) U.S. Cl.
CPC .............. *B60R 19/48* (2013.01); *B60R 19/52* (2013.01); *B62D 33/0207* (2013.01); *B60R 2019/522* (2013.01); *B62D 33/0273* (2013.01)

(58) Field of Classification Search
CPC ..... B60R 1/12; B60R 1/04; B60R 2001/1253; B60R 2001/1284; B60R 9/06; B60R 9/00; G02B 2027/0118; B62D 33/0273; B60P 3/40; B60P 1/003
See application file for complete search history.

(56) References Cited

U.S. PATENT DOCUMENTS

| | | | | |
|---|---|---|---|---|
| 2,396,652 | A * | 3/1946 | Heilman | B60R 19/52 293/115 |
| 4,099,760 | A * | 7/1978 | Mascotte | B60R 19/52 224/402 |
| 5,326,142 | A * | 7/1994 | Dodds | B60Q 1/2611 180/68.6 |
| 5,468,038 | A * | 11/1995 | Sauri | B62D 33/0273 296/26.1 |

(Continued)

*Primary Examiner* — Kiran B Patel
(74) *Attorney, Agent, or Firm* — Christopher J. Darrow; Darrow Mustafa PC

(57) ABSTRACT

A modular system is provided for a multi-purpose accessory configured to selectively operate as a brush guard, a cabin protector, and a tailgate extender for a vehicle. The system includes a first mounting structure connected to a front frame of the vehicle. A second mounting structure is connected to a cabin portion of the vehicle, and a third mounting structure is connected to a tailgate of the vehicle. A multi-purpose accessory is provided including a main body portion and at least one attachment member extending from the main body portion. The attachment member is configured to alternately be received by the first mounting structure, wherein the multi-purpose accessory serves as a brush guard; the second mounting structure, wherein the multi-purpose accessory serves as a cabin protector; and the third mounting structure, wherein the multi-purpose accessory serves as a tailgate extender.

13 Claims, 6 Drawing Sheets

(56) References Cited

U.S. PATENT DOCUMENTS

| | | | | |
|---|---|---|---|---|
| 5,775,759 A * | 7/1998 | Cummins | ......... | B62D 33/0273 296/26.11 |
| D396,678 S * | 8/1998 | Shklyaver | ................... | D12/171 |
| 5,816,638 A * | 10/1998 | Pool, III | ................. | B60P 1/435 296/26.11 |
| 5,900,199 A * | 5/1999 | Dickson | .............. | B29C 45/1704 264/572 |
| 6,227,593 B1 * | 5/2001 | De Valcourt | ............ | B60P 1/435 296/26.08 |
| 6,231,093 B1 * | 5/2001 | Storer | ..................... | B60R 19/52 293/115 |
| 6,283,525 B1 | 9/2001 | Morse | | |
| 6,447,032 B1 * | 9/2002 | Howell, Sr. | ............... | B60R 9/06 211/59.2 |
| 6,626,478 B1 * | 9/2003 | Minton | ..................... | B60P 3/40 224/403 |
| 7,121,596 B2 | 10/2006 | Rood | | |
| 7,261,346 B1 * | 8/2007 | Kubesh | .................. | B60R 19/52 180/68.6 |
| D572,180 S * | 7/2008 | Storer | ......................... | D12/171 |
| 7,469,958 B2 | 12/2008 | Hastings | | |
| 7,736,105 B2 | 6/2010 | Landry | | |
| 8,075,037 B2 | 12/2011 | Mahaffy | | |
| 8,757,694 B1 * | 6/2014 | Kuhnle | ................ | B62D 33/033 296/26.08 |
| 8,801,058 B2 | 8/2014 | Hanson et al. | | |
| 8,998,291 B1 * | 4/2015 | Addis | .................... | B60R 19/52 293/115 |
| 2004/0160050 A1 * | 8/2004 | Strong | ................... | B60R 19/02 280/784 |
| 2006/0061114 A1 * | 3/2006 | Leitner | .............. | B62D 33/0273 296/26.11 |
| 2007/0080548 A1 * | 4/2007 | Joseph | ................... | B60R 19/48 293/117 |
| 2008/0111390 A1 * | 5/2008 | Smith | ................. | B62D 33/033 296/50 |
| 2008/0231067 A1 * | 9/2008 | Nagle | ....................... | B60P 3/07 296/50 |
| 2008/0284190 A1 * | 11/2008 | Leitner | .................... | B60P 3/40 296/26.11 |
| 2011/0006553 A1 * | 1/2011 | Fretz | ...................... | B60R 19/48 293/115 |
| 2013/0049384 A1 * | 2/2013 | Kekich, Jr. | ............. | B60R 19/52 293/115 |
| 2015/0021937 A1 * | 1/2015 | Perez | .................. | B60Q 1/0005 293/115 |
| 2016/0325700 A1 * | 11/2016 | Wheeler | ................... | B60R 11/06 |
| 2017/0136972 A1 | 5/2017 | Drever | | |
| 2017/0282979 A1 * | 10/2017 | Singer | ............... | B62D 33/0273 |
| 2017/0327159 A1 | 11/2017 | Smith | | |

* cited by examiner

MULTI-PURPOSE BRUSH GUARD, CABIN PROTECTOR, AND TAILGATE EXTENDER ACCESSORY

TECHNICAL FIELD

The present disclosure generally relates to an interchangeable vehicle accessory, and more particularly, to a multi-purpose accessory removably attachable to serve as a brush guard, a cabin protector, and a tailgate extender for a vehicle.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Many load carrying utility vehicles may be operated or used in an off-road environment and/or otherwise be used to transport cargo. In certain instances, the transported cargo is large or oddly shaped, potentially creating a risk for damage to the vehicle during loading or transport, or requiring extra space. Vehicle accessories and protective devices including brush guards, cabin protectors, tailgate extenders, and the like are becoming increasingly popular for use with various utility vehicles such as pickup trucks. Certain accessories may be used more for aesthetic reasons than functional purposes. However, in order to properly serve their intended purpose, the above-mentioned accessories need to be provided with adequate strength, which may add to the overall weight of the vehicle, and increase fuel costs, in addition to the costs of the accessories by themselves.

Accordingly, it would be desirable to provide improved accessories, including accessories that can be interchanged and serve multiple functions instead of just serving a single conventional use or capacity.

SUMMARY

This section provides a general summary of the disclosure, and is not a comprehensive disclosure of its full scope or all of its features.

In various aspects, the present teachings provide a modular system with a multi-purpose accessory configured to selectively operate as a brush guard, a cabin protector, and a tailgate extender for a vehicle. The system includes a first mounting structure connected to a front frame of the vehicle. A second mounting structure is connected to a cabin portion of the vehicle, and a third mounting structure connected to a tailgate of the vehicle. A multi-purpose accessory is provided including a main body portion and at least one attachment member extending from the main body portion. The attachment member is configured to alternately be received by the first mounting structure, wherein the multi-purpose accessory serves as a brush guard; the second mounting structure, wherein the multi-purpose accessory serves as a cabin protector; and the third mounting structure, wherein the multi-purpose accessory serves as a tailgate extender.

In other aspects, the present teachings provide a vehicle assembly with a multi-purpose accessory configured to selectively operate as a brush guard, a cabin protector, and a tailgate extender for the vehicle. The assembly includes a front frame comprising a first mounting structure. A passenger cabin is provided, comprising a second mounting structure. The vehicle further includes a cargo bed comprising a third mounting structure. A multi-purpose accessory is provided, including a main body portion and at least one attachment member extending from the main body portion. The attachment member is configured to alternately be received by the first mounting structure to serve as a brush guard; the second mounting structure to serve as a cabin protector; and the third mounting structure to serve as a tailgate extender.

In still other aspects, the present teachings provide a utility vehicle with a multi-purpose accessory configured to selectively operate as a brush guard, a cabin protector, and a tailgate extender for the utility vehicle. The utility vehicle includes a front frame with a first mounting structure coupled to the front frame; a passenger cabin with a second mounting structure coupled to the passenger cabin; and a cargo bed defined by a floor, a forward wall, two side walls, and a movable tailgate having an open position and a closed position. A third mounting structure is coupled to the tailgate. The multi-purpose accessory includes a main body portion and two wing portions. Each wing portion is hingedly coupled to first and second opposing ends of the main body portion. At least one attachment member is provided extending from the main body portion and configured to alternately be received by the first mounting structure to serve as a brush guard; the second mounting structure to serve as a cabin protector; and the third mounting structure to serve as a tailgate extender.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
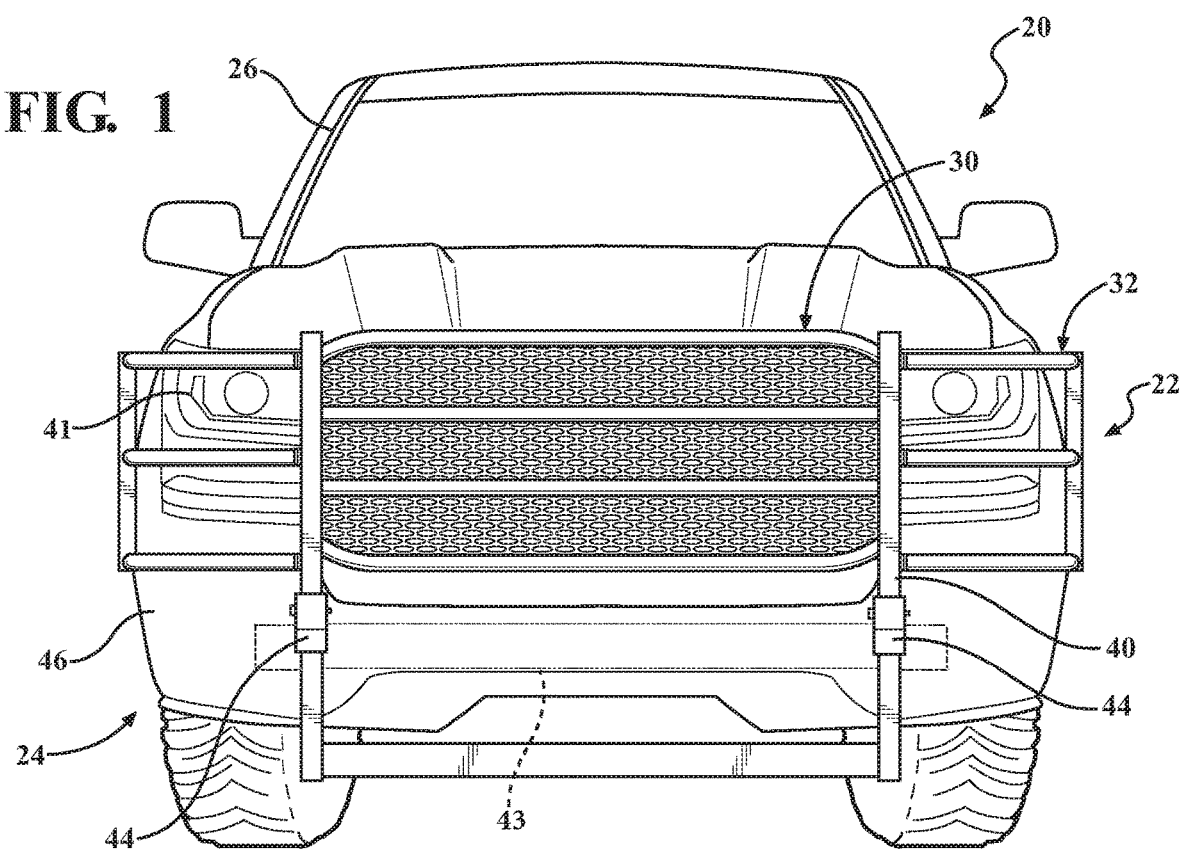
FIG. 1 is a front perspective view of a pickup truck having an exemplary multi-purpose accessory coupled to a front portion of the pickup truck, configured to serve as a brush guard.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally provides a modular system with one multi-purpose accessory that is configured to selectively fulfill multiple different roles, including interchangeably functioning as a brush guard, a cabin protector, and a tailgate extender. For example, various mounting structures are provided on different areas of the vehicle configured to couple the multi-purpose accessory to the vehicle for its desired use.

While the present technology may be described and presented in the drawings with respect to a pickup truck as an exemplary utility vehicle, it should be understood that the multi-purpose accessory disclosed herein may be used with a variety of differently configured vehicles, for travel either on paved government streets/roads as well as for off-road use.

Brush guards, also known as grille guards, are commonly mounted to a front portion of a vehicle in order to protect the headlamps and grille portion of the vehicle from direct contact with brush or other obstacles/materials when the vehicle is used in an off-road environment. Brush guards may also provide the same protection for everyday use, for example, by protecting the grille and headlamps from minor accidents or contact with another vehicle or obstacle, such as parking poles and guides.

Passenger cabin protectors, or simply "cab" protectors, are commonly mounted adjacent a rear portion of a passenger cabin compartment of a utility vehicle, such as a pickup truck, in order to protect cargo from contacting the passenger cabin compartment. For example, a cabin protector may protect a rear window of the passenger compartment during the loading of an all-terrain vehicle (ATV), motor cycle, or the like, into a cargo area of the vehicle. During movement of the vehicle, the cab protector may also protect the passenger cabin from shifting cargo during sudden stops, and the like.

Tailgate extenders, or truck bed extenders, are commonly mounted adjacent an end region of a truck bed, or cargo area, and may define a perimeter for extending a length dimension of the truck bed or cargo area in order to provide increased storage capacity for bulky items. During use, the tailgate of the vehicle is provided in an open state configuration, which is generally horizontal and level with the truck bed, allowing the tailgate to function as the floor portion of the extended cargo area.

The present technology advantageously provides an easily removable and exchangeable vehicle accessory that can selectively be located and installed for use as a brush guard, a cabin protector, and a tailgate extender for a vehicle. FIG. 1 is a front perspective view of an exemplary vehicle, a pickup truck 20, having one non-limiting example of a multi-purpose accessory 22 coupled to a front portion 24 of the pickup truck 20. Thus, FIG. 1 illustrates one configuration with the multi-purpose accessory 22 functioning in a brush guard capacity. As discussed above, this configuration may be particularly useful in off-road driving to prevent or minimize damage to the front portion 24 of the vehicle 20. The placement of the multi-purpose accessory 22 in this configuration may also serve as a default position, for example, when there is no current need to protect the passenger cabin 26 area or to extend the rear cargo carrying area 28.

Figure 2:
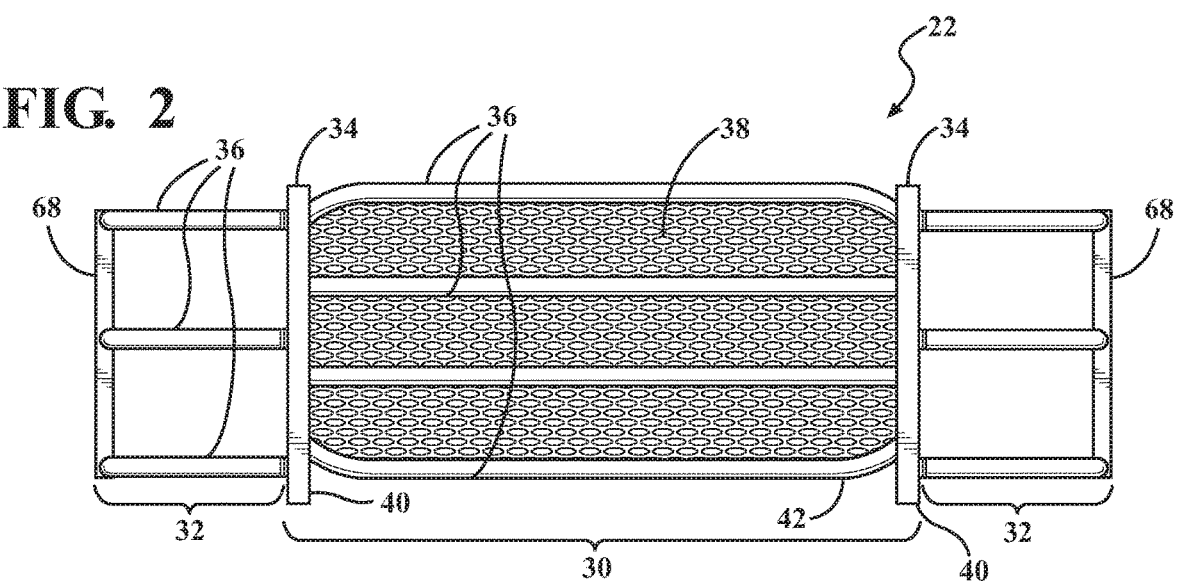
FIG. 2 is a front plan view of an exemplary multi-purpose accessory according to the present teachings.

FIG. 2 is a front plan view of an exemplary multi-purpose accessory 22. In various aspects, the multi-purpose accessory 22 may include a main body portion 30 and one or more optional wing portions 32 coupled to opposing sides 34 of the main body portion 30. In the example shown, the main body portion 30 may be defined by a plurality of support members 36 coupled to the opposing ends, or sides 34, of the main body portion 30. The support members 36 may be hollow tubular or square shaped members, with their shape, size, and material selection based on required strength needs or aesthetic preferences. The multi-purpose accessory 22 may be coated or painted as desired. Although FIG. 2 illustrates a plurality of tubular support members 36 arranged in a horizontal manner, the support members 36 may also be vertically aligned, or angled, or provided in any number of different shapes that still ultimately provide for the intended function of the multi-purpose accessory 22. An optional mesh portion 38, or similar, may also be provided, attached or coupled to the main body portion 30.

In certain aspects, the multi-purpose accessory 22 may be a single monolithic component that includes the main body portion 30 as well as any optional side or wing portions 32. The side wing portions 32 may be static or movable with respect to the main body portion 30. For example, in certain aspects, the side wing portions 32 are separate components that may be removably coupled to the ends or sides 34 of the main body portion 30 with one or more mechanical fastener (not specifically shown). In this regard, different sized or shaped wing portions 32 may be used in an interchangeable manner. In some aspects, the wing portions 32 may be curved to follow a profile of the front vehicle. In still other aspects, the wing portions 32 may be rotatably coupled to the opposing ends 34 of the main body portion 22. Such coupling may be achieved using hinges, or the like. In various aspects, one or more wing portion 32 may be rotatable from 0 to about 45 degrees with respect to a plane defined by the main body portion 30. In this regard, the wing portion 32 may be better aligned with a front profile or front portion 24 of the vehicle 20. In other aspects, the one or more wing portion 32 may be rotatable from 0 to about 180 degrees with respect to a plane defined by the main body portion 30, such that the wing portion 32 may be rotated substantially flush with the main body portion 30, thereby occupying less linear space, which may be particularly preferred for storage purposes.

The multi-purpose accessory may also be provided with one or more attachment member 40 extending from a lower portion 42 of the main body portion 30. For simple designs, the attachment member 40 may simply be a tubular member or support member that removably couples to a receiving member or mounting structure, such as a bracket located on the vehicle, as discussed in more detail below.

With renewed reference to FIG. 1, the main body portion 30 of the multi-purpose accessory 22 may essentially be aligned with the a grille portion of the vehicle 20, while the wing portions 32 may be aligned with the headlamps 41, fog lamps, or other areas of the front portion 24 of the pickup truck 20 that may require protection. As discussed above, the wing portions 32 may be angled with respect to the main body portion 30 to match with a profile of the front of the vehicle 20. In this particular aspect, there are two attachment members 40 shown removably coupled to two receiving members, such as a pair of respective mounting structures 44, that extend in front of the bumper 46 and may ultimately be connected to a front frame 43 (or similar support structure) of the vehicle 20. In one aspect, the coupling can be made with a removable mechanical fastener, such as a bolt and locking cotter pin assembly. In other designs, as will be described with respect to FIG. 8, the mounting structures 44 may extend through apertures defined in the front bumper 46 and be coupled directly to a front frame portion of the vehicle 20.

Figure 3:
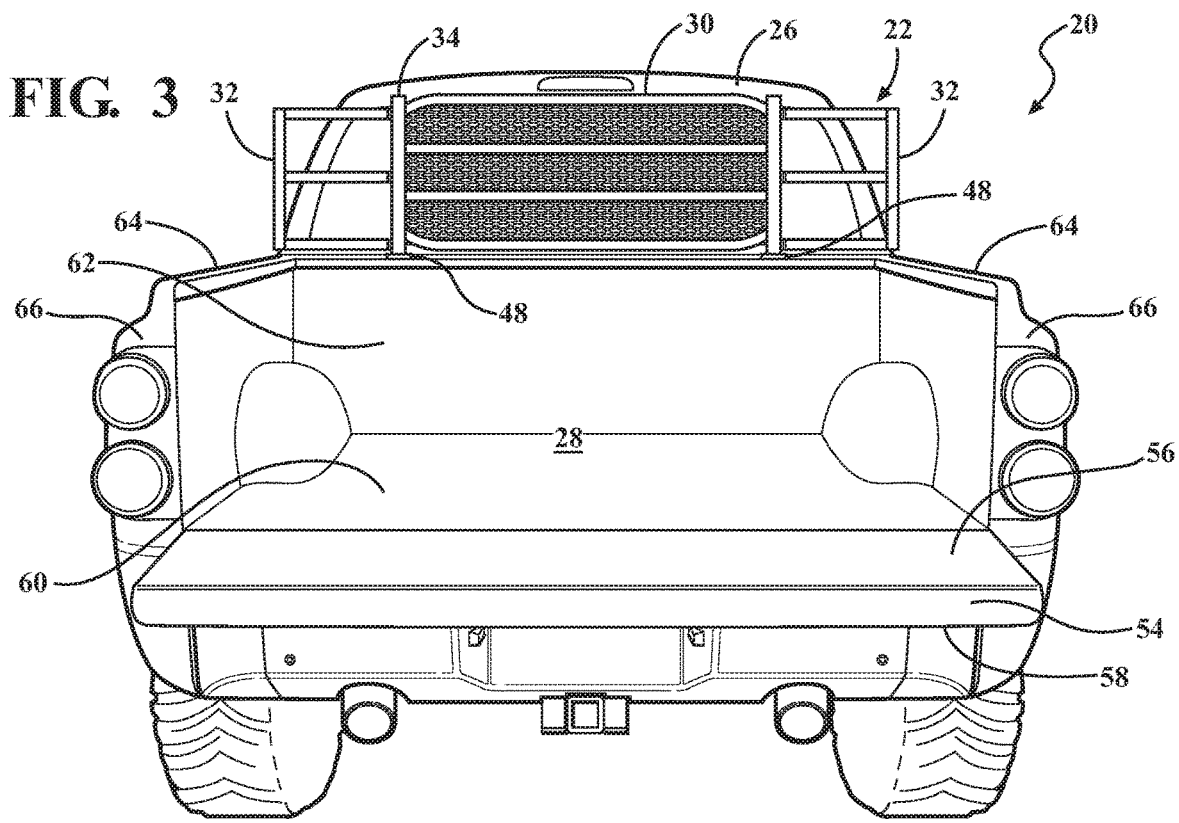
FIG. 3 is a rear perspective view of the pickup truck of FIG. 1 having the exemplary multi-purpose accessory coupled to a rear passenger portion of the pickup truck, configured to serve as a cabin protector.
Figure 5:
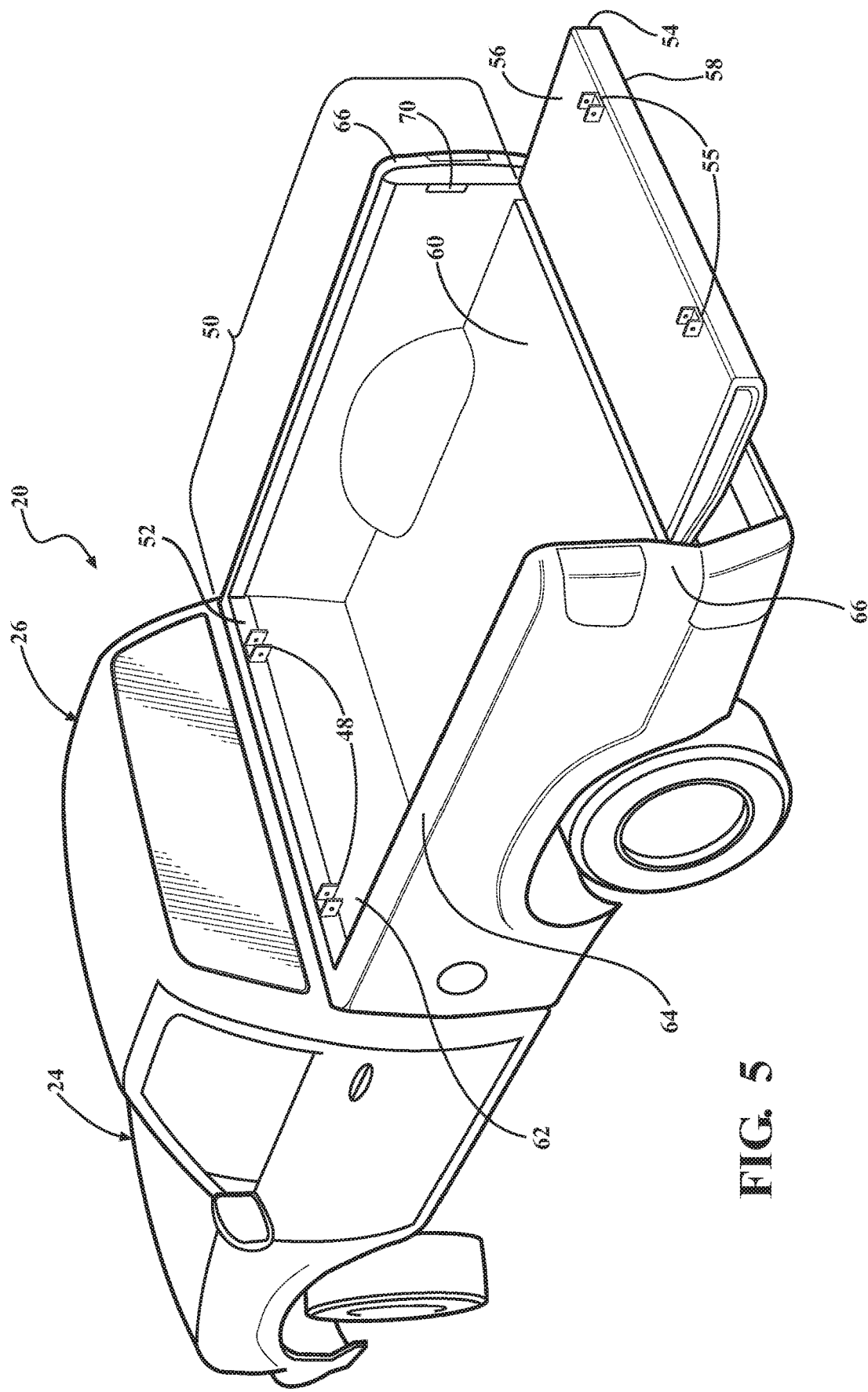
FIG. 5 is a side perspective view of the pickup truck of FIG. 1 illustrating various different mounting structures.

FIG. 3 is a rear perspective view of the pickup truck of FIG. 1 having the exemplary multi-purpose accessory 22 coupled to a rear of the passenger cabin portion 26 of the truck. Thus, FIG. 3 illustrates on configuration with the multi-purpose accessory 22 configured to serve as a cabin protector, or cab protector. In this particular aspect, there are two attachment members 40 shown removably coupled to two receiving members, such as a pair of respective mounting bracket structures 48, that may extend from a rear area of the passenger cabin 26, and may ultimately connected to a reinforcement support structure or frame structure of the passenger cabin 26 and/or the components that define cargo bed area 50. In the non-limiting example as shown in FIGS. 3 and 5, the mounting bracket structures 48 may be coupled to a deck header portion 52 of a cargo bed area 50 of the pickup truck 20. As discussed above, the coupling can be made with a removable mechanical fastener, such as a bolt and locking cotter pin assembly.

Figure 4:
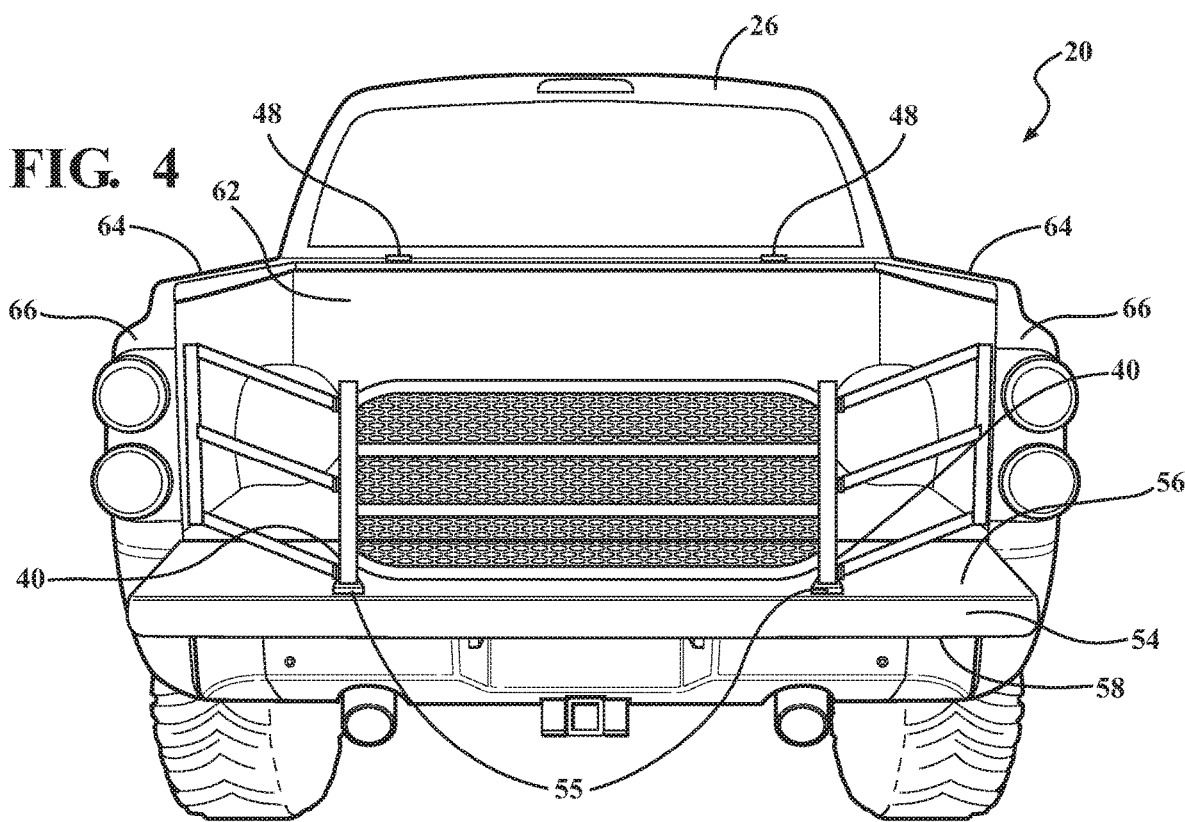
FIG. 4 is a rear perspective view of the pickup truck of FIG. 1 having the exemplary multi-purpose accessory coupled adjacent to a movable tailgate of the pickup truck, configured to serve as a tailgate extender.

FIG. 4 is a rear perspective view of the pickup truck 20 of FIG. 1 having the exemplary multi-purpose accessory coupled to a movable tailgate 54 of the pickup truck 20. Thus, FIG. 4 illustrates one configuration with the multi-purpose accessory 22 functioning as a tailgate extender. In this particular aspect, there are two attachment members 40 shown removably coupled to two receiving members, such as a pair of respective mounting bracket structures 55, which may be coupled to the tailgate 54. In various aspects, the vehicle tailgate 54 may include an inner wall 56 and an outer wall 58 made of sheet metal, a plastic material, a composite material, or the like. For vehicles such as a pickup truck with a standard drop-down (pivoting) tailgate 54, the tailgate 54 may be provided with a substantially upright position, in which the inner wall 56 forms a part of the cargo bed area 50 of the pickup truck 20. The inner wall 56 and the outer wall 58 may cooperate to define the tailgate 54, which may include one or more support members or reinforcements beams disposed therein (not shown). The tailgate 54 may have a drop down position, as shown in FIGS. 4 and 5. When in this position, the inner wall 56 and the outer wall 58 are substantially parallel with the floor and the ground. The mounting bracket structures 55 may be coupled to the inner wall 56 of the tailgate 54, and may be further coupled to the one or more support or frame components optionally disposed therein. Similar to that discussed above, the coupling of the attachment members 40 of the multi-purpose accessory 22 to the mounting bracket structures 55 of the tailgate 54 can be made with a removable mechanical fastener, such as a bolt and locking cotter pin assembly.

FIG. 5 a side perspective view of the pickup truck of FIG. 1, and generally illustrates the various different mounting bracket structures 48, 55 useful with the multi-purpose accessory of the present technology when functioning as a cab protector or tailgate extender. In various aspects, all or some of the mounting bracket structures 44, 48, 55 may be of similar design and otherwise functionally equivalent, such that the multi-purpose accessory 22 is easily interchangeable between all positions. It should be understood that the multi-purpose accessory 22 and accompanying mounting structures and brackets may be provided with the vehicle 20 as OEM components, or can be added to the vehicle 22 as aftermarket products. FIG. 5 illustrates one exemplary cargo bed area 50, which may be defined by a floor portion 60, a forward wall 62 adjacent a rear portion the passenger cabin 26, two opposing side walls 64, and a movable tailgate 54 that is operable to be in at least an open position and a closed position.

Figure 6A:
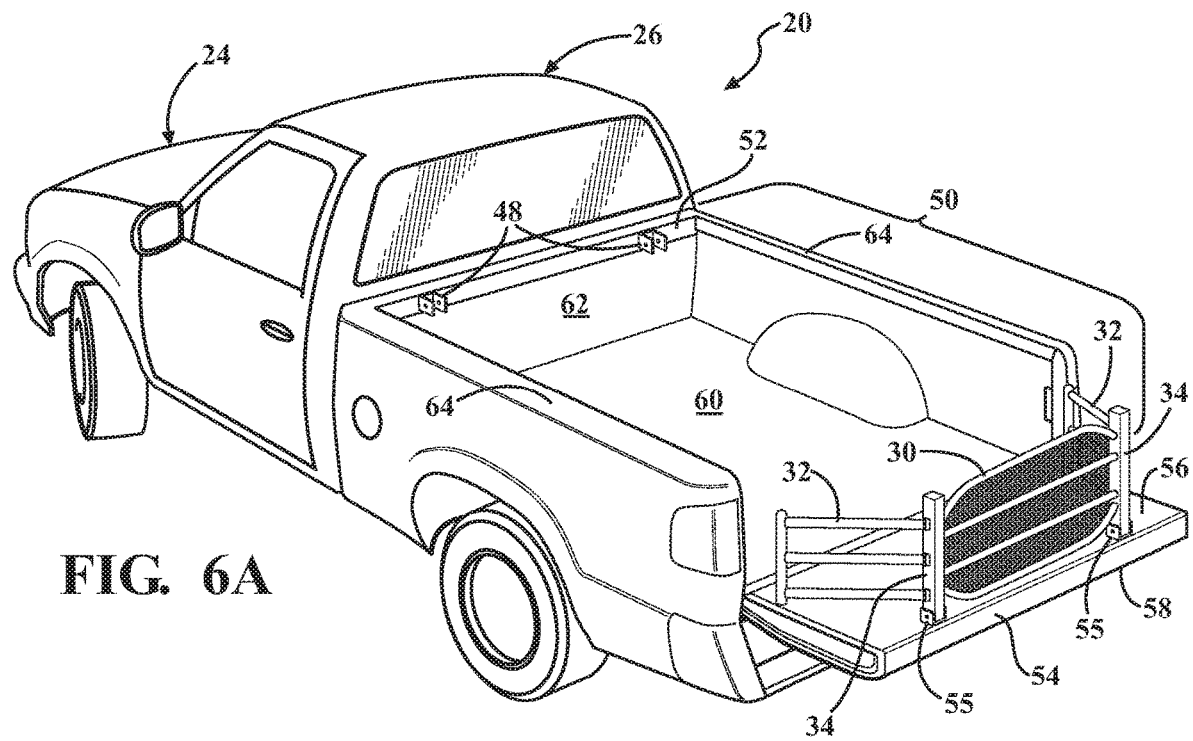
FIG. 6A is a side perspective view of the pickup truck of FIG. 5, illustrating the multi-purpose accessory coupled to the movable tailgate of the pickup truck, configured to serve as a tailgate extender.

FIG. 6A is a side perspective view of the pickup truck of FIG. 5, illustrating the multi-purpose accessory 22 coupled to brackets 55 attached to the inner wall 56 of the movable tailgate 54 of the pickup truck in an open position. FIG. 6A is similar to the configuration shown in FIG. 4 with the multi-purpose accessory 22 functioning as a tailgate extender.

Figure 6B:
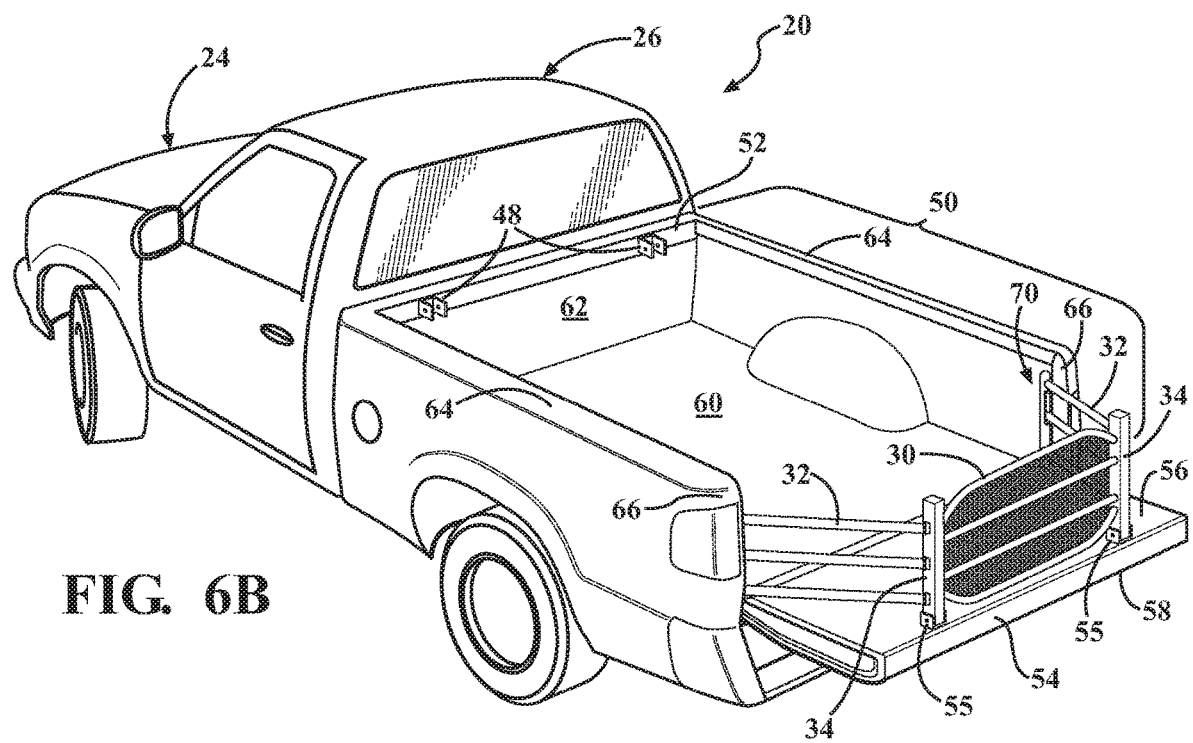
FIG. 6B is a side perspective view of the pickup truck of FIG. 5, illustrating the multi-purpose accessory coupled to a rear deck posts of the pickup truck and in a first position, configured to serve as a tailgate extender.
Figure 6C:
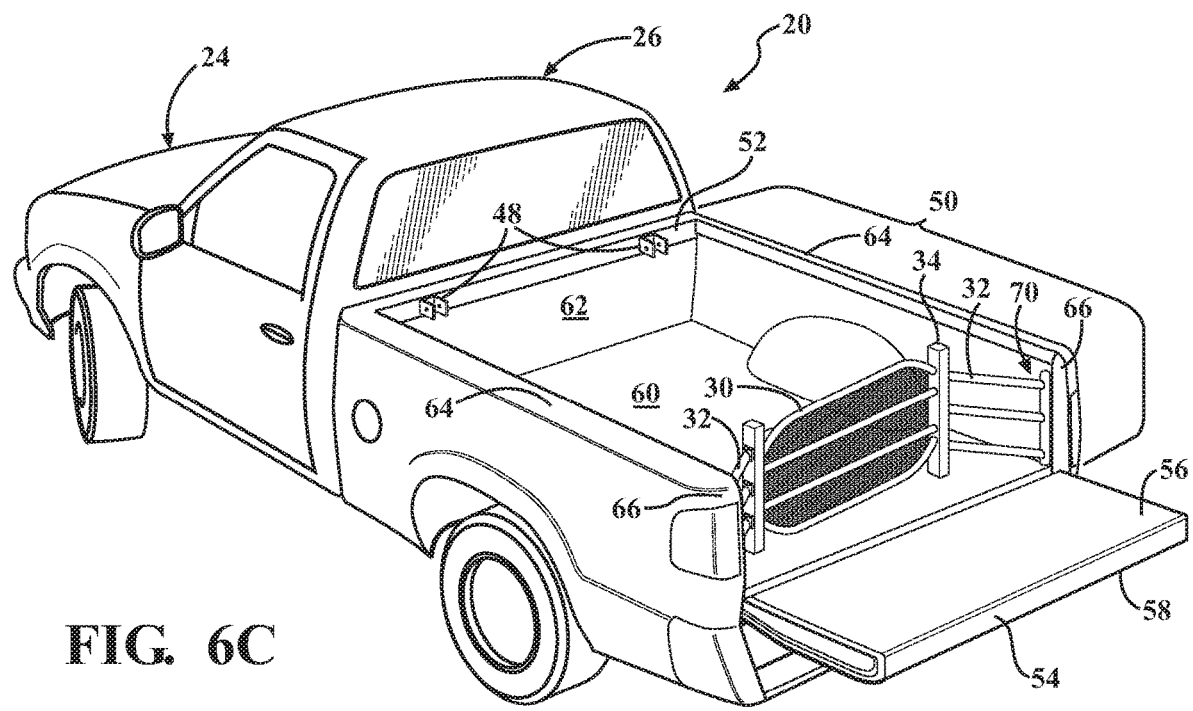
FIG. 6C is a side perspective view of the pickup truck of FIG. 5, illustrating the multi-purpose accessory coupled to the rear deck posts of the pickup truck and in a second position, configured in a storage position within the cargo bed of the pickup truck.

In still other aspects, the multi-purpose accessory may be coupled to the side portions of the cargo bed area 50, and in particular, may be removably coupled to the rear deck posts 66 of the cargo bed 50. The rear deck posts 66 are ultimately coupled to a rear portion the frame of the pickup truck 20, and provide a strong reinforcement connection. FIG. 6B is a side perspective view of the pickup truck of FIG. 5, illustrating the multi-purpose accessory coupled to the rear deck posts 66 of the pickup truck 20 and in a first position, configured to serve as a tailgate extender. As shown, the ends 68 of the respective wing portions 32 of the multi-purpose accessory 22 may be provided with an attachment mechanism for connection a mounting structure 70 coupled with the respective rear deck posts 66. This coupling to the rear deck posts 66 may be in addition to the coupling of the attachment members 40 to the mounting brackets 55. In other aspects, there may only be coupling to the rear deck posts 66, and the attachment members 40 of the multi-purpose accessory 22 may rest on the tailgate 54, or the inner wall 56 of the tailgate 54 may define apertures for receiving the attachment members 40. FIG. 6C is a side perspective view of the pickup truck of FIG. 5, illustrating the multi-purpose accessory 22 coupled to the rear deck posts 66 of the pickup truck and in a second position, configured in a storage position within the cargo bed of the pickup truck 20. Although shown in the open position for clarity, when the multi-purpose accessory 22 is in the second position as shown in FIG. 6C, the tailgate 54 can be raised, in its closed position. In various aspects, the multi-purpose accessory 22 is rotatably coupled to the respective rear deck posts 66 such that the multi-purpose accessory 22 can rotate between the positions as shown in FIGS. 6B and 6C.

FIGS. 7-10 are provided to illustrate various details of the mounting structures and mounting brackets useful with the multi-purpose accessory 22. It should be understood that these structures and brackets are provided as exemplary designs, and various modifications may be made as desired or required for different end uses.

Figure 7:
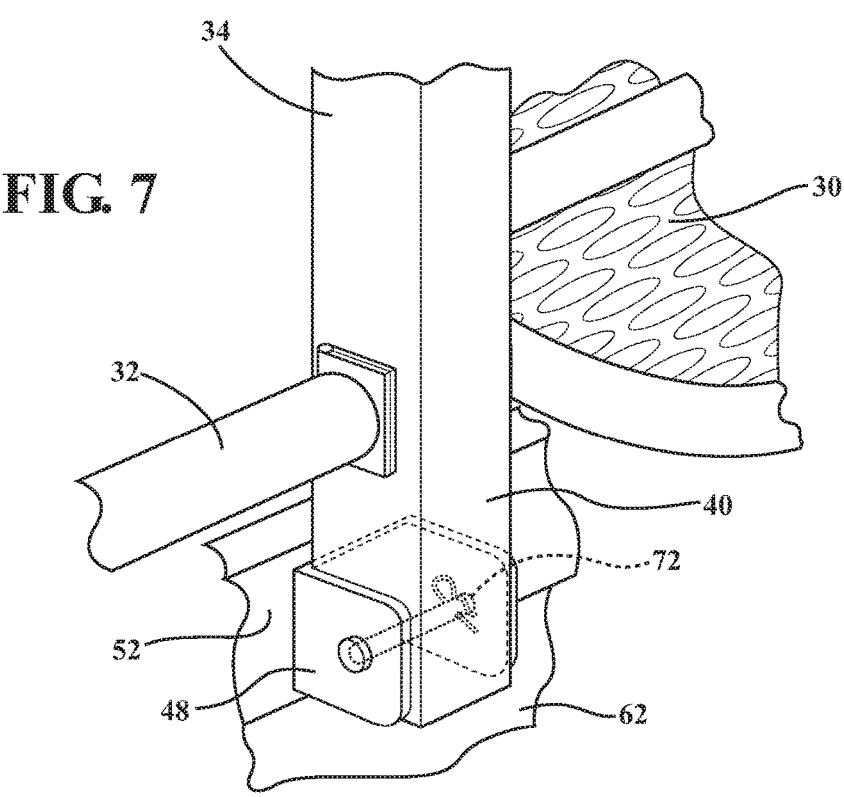
FIG. 7 is detailed view of one of the mounting structures useful for a cabin protector.

FIG. 7 is detailed view of one of the mounting structures 48 useful for the multi-purpose accessory 22 functioning as a cabin protector. As shown, the mounting structure 48 may be a simple bracket 48 coupled to the deck header 52, and the multi-purpose accessory 22 is coupled to the bracket 48 with a locking pin 72. As discussed above, the mounting structures 44, 48, 55 may be designed for use with removable fasteners or quick connect type coupling mechanisms. In one example, a cotter pin or locking pin 72 may be used that slidably engages a pair of co-aligned apertures in the bracket 48. Although the details are not shown, the locking pin 72 may be provided with a suitable handle or gripping portion for a user to grasp when moving the locking pin 72, as well as any necessary biasing member, such as a coil spring, that may be provided for urging a locking pin shaft toward a locked position.

Figure 8:
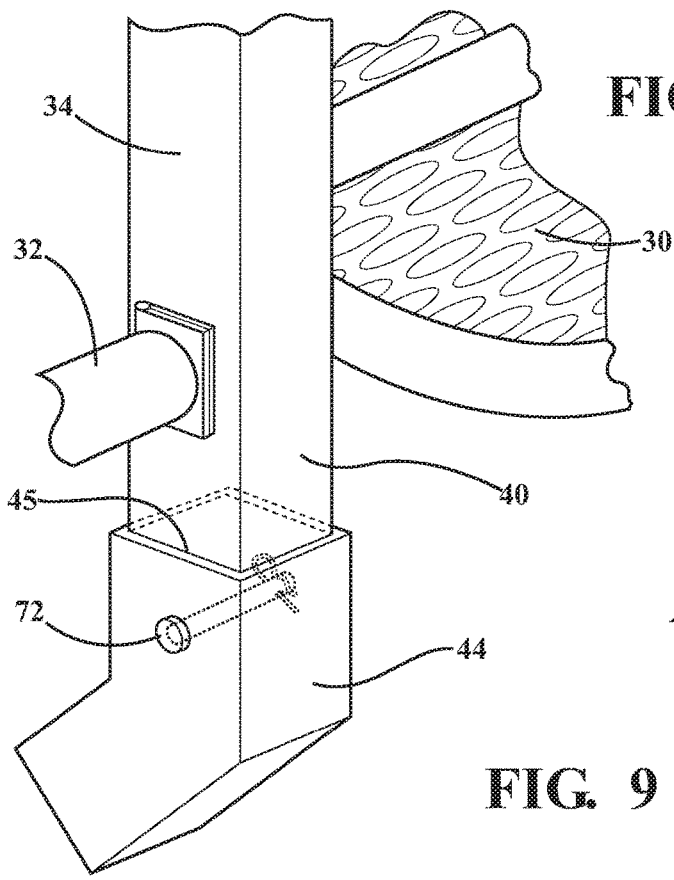
FIG. 8 is a detailed view of one of the mounting structures useful for a brush guard.
Figure 9:
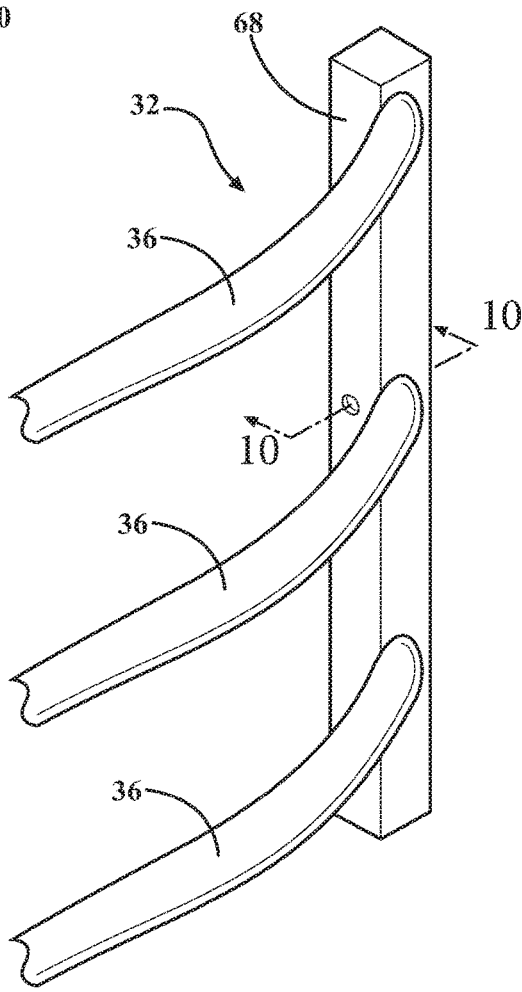
FIG. 9 is a detailed view of a side wing portion of the multi-purpose accessory that will be coupled to a rear deck post of the pickup truck.
Figure 10:
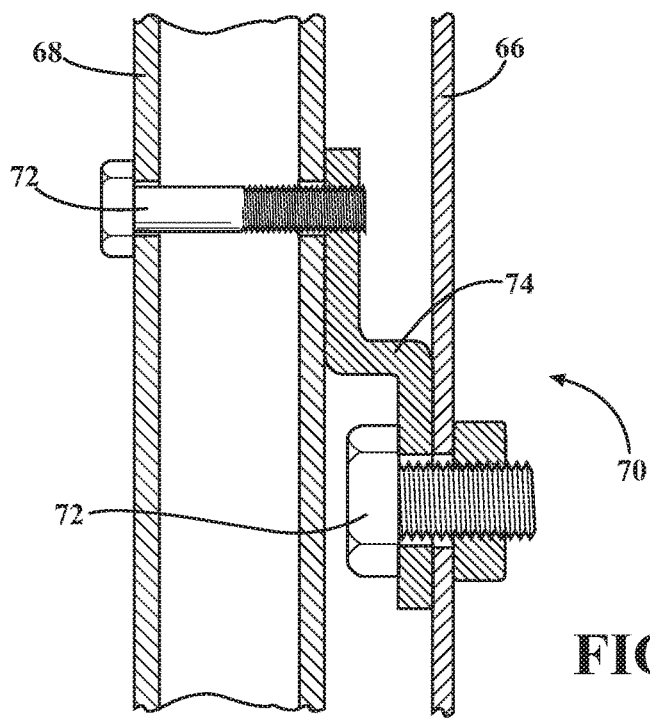
FIG. 10 is a cross-sectional detailed view of one of the mounting structures configured to couple the side wing portions to the rear deck post.

FIG. 8 is a detailed view of one of the mounting structures 44 useful for the multi-purpose accessory 22 functioning as a brush guard. In this example, the attachment members 40 are received into an aperture 45 defined in the mounting bracket 44 that is ultimately coupled to the front frame. In certain aspects, the mounting structure 44 may extend down in front of and under the front bumper 46 for coupling with the vehicle frame. In other aspects, the mounting structure 44 may extend through the front bumper and connect directly to the vehicle frame. In still other aspects, the mounting structure for the brush guard feature may be a bracket, similar to that shown in FIG. 7, coupled to the frame through the front bumper 46. FIG. 9 is a detailed view of one of the side wing portions 32 of the multi-purpose accessory 22 that may be coupled to a rear deck post 66 of the pickup truck for the multi-purpose accessory 22 to function as a tailgate extender. Lastly, FIG. 10 is a cross-sectional detailed view of one of the mounting structures 70 configured to couple the side wing portions 32 to the rear deck post 66. As shown, the exemplary mounting structure may include a shaped bracket 74 with two locking pins 72, or equivalent fasteners, such that the multi-purpose accessory 22 can be rotated between the two positions as shown in FIGS. 6B and 6C.

The various mounting structures 44, 48, 55 may be permanently affixed to their respective locations on the vehicle. In certain aspects, one or more of the mounting structures 44, 48, 55 may be removably coupled to the vehicle 20, and in other aspects, may even be retractable within portions of the vehicle such that they are stored when not in use, and do not otherwise interfere with the use of the vehicle for other purposes.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A vehicle assembly including a vehicle and a multi-purpose accessory configured to selectively operate as a brush guard, a cabin protector, and a tailgate extender for the vehicle, the vehicle assembly comprising:
   a front frame comprising a first mounting structure;
   a passenger cabin;
   a cargo bed adjacent the passenger cabin, the cargo bed including a deck header portion comprising a second mounting structure, and a moveable tailgate comprising a third mounting structure; and
   a multi-purpose accessory, comprising:
      a main body portion;
      at least one attachment member extending from the main body portion and configured to alternately be received by:
         the first mounting structure, wherein the multi-purpose accessory is configured to serve as a brush guard;
         the second mounting structure, wherein the multi-purpose accessory is configured to serve as a cabin protector; and
         the third mounting structure, wherein the multi-purpose accessory is configured to serve as a tailgate extender.

2. The vehicle assembly according to claim 1, wherein the multi-purpose accessory comprises a pair of attachment members, and each of the first mounting structure, the second mounting structure and the third mounting structure comprises a pair of brackets for removably coupling to the attachment members.

3. The vehicle assembly according to claim 1, wherein the multi-purpose accessory is further secured to opposing rear deck posts of the vehicle.

4. The vehicle assembly according to claim 3, further comprising a pair of brackets configured to rotatably couple the multi-purpose accessory to the respective rear deck posts.

5. The vehicle assembly according to claim 1, wherein the first mounting structure comprises a pair of brackets coupled directly to the front frame of the vehicle.

6. The vehicle assembly according to claim 1, wherein the second mounting structure comprises a pair of brackets coupled to the deck header of the cargo bed.

7. The vehicle assembly according to claim 1, wherein the third mounting structure comprises a pair of brackets coupled to the tailgate of the vehicle.

8. The vehicle assembly according to claim 1, wherein the main body portion of the multi-purpose accessory defines first and second opposing ends and further comprises two wing portions, each wing portion being coupled to one of the first and second opposing ends.

9. The vehicle assembly according to claim 8, wherein each wing portion is hingedly coupled to the respective first and second opposing end such that each wing portion is rotatable from 0 to about 45 degrees with respect to the main body portion.

10. The vehicle assembly according to claim 1, wherein the cargo bed is defined by a floor, a forward wall, and two side walls, and the third mounting structure is coupled to an interior side of the moveable tailgate.

11. The vehicle assembly according to claim 1, wherein the second mounting structure comprises a pair of brackets coupled to the deck header portion.

12. The vehicle assembly according to claim 1, wherein the cargo bed further comprises opposing rear deck posts, each rear deck post comprising a mounting structure configured to rotatably couple the multi-purpose accessory between a first position wherein the multi-purpose accessory is located within a cargo area of the vehicle, and a second position wherein the multi-purpose accessory is configured to serve as the tailgate extender.

13. The vehicle assembly according to claim 1, wherein at least one of the first, second, and third mounting structures is removably coupled to the vehicle.

* * * * *